United States Patent [19]

Bohenek et al.

[11] 3,987,821

[45] Oct. 26, 1976

[54] GAS-FILLED THERMOMETER

[75] Inventors: Leonard J. Bohenek, Northampton; David G. Grier, Elkins Park, both of Pa.

[73] Assignee: Ametek, Inc., New York, N.Y.

[22] Filed: May 8, 1975

[21] Appl. No.: 575,824

[52] U.S. Cl. .............................. 138/177; 73/411; 73/368
[51] Int. Cl.² .................. F16L 9/00; G01L 7/04; G01K 5/02
[58] Field of Search ............. 138/177, 148; 73/368, 73/411; 236/57

[56] References Cited
UNITED STATES PATENTS
3,067,616  12/1962  Silver ................................. 73/411
FOREIGN PATENTS OR APPLICATIONS
909,993  11/1962  United Kingdom ................. 73/411

OTHER PUBLICATIONS
Mathews, Charles C., "Bourdon Elements Require Special Tubing," May 1957, Instruments and Automation, p. 891, vol. 30.

Primary Examiner—Richard E. Aegerter
Assistant Examiner—Larry Jones
Attorney, Agent, or Firm—Smythe & Moore

[57] ABSTRACT

A Bourdon tube sensing element for a fluid-filled temperature gauge is made by inserting strips of silicone rubber into a partially flattened tube, especially one of beryllium copper, which is shaped on a fixture or mandrel. The shaped tube is subjected to a heat treatment during which the silicone rubber expands and deforms the tube. After heat treatment, the tube is cooled retaining its shape and the silicone rubber contracts from the inner surface of the tube to form a small passage between the silicone rubber and the tube so that the pressure of the fluid may be uniformly applied to the interior walls of the tube.

4 Claims, 4 Drawing Figures

U.S. Patent  Oct. 26, 1976  3,987,821
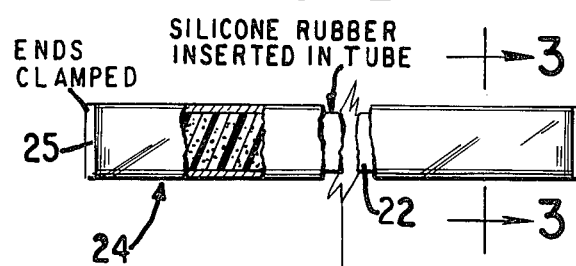
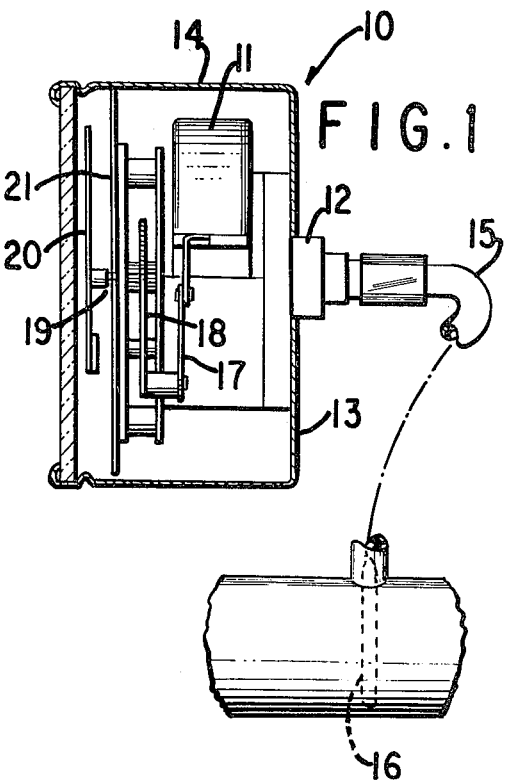
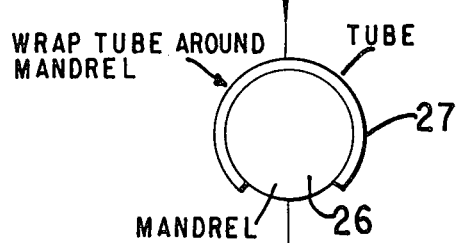
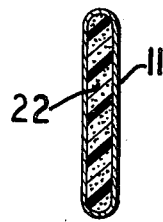
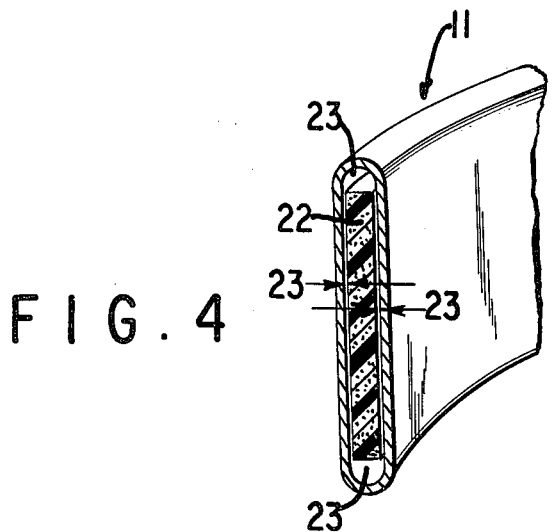

GAS-FILLED THERMOMETER

The present invention relates to a fluid-filled, such as with a gas, Bourdon tube temperature indicator instrument.

Temperature measuring instruments have been constructed wherein a Bourdon tube is employed. The Bourdon tube measures the pressure of fluid sealed within the system comprised of the Bourdon tube, connected by small tubing to a temperature sensing bulb. Increasing the temperature at the sensing bulb causes an increase in the fluid pressure within the system. The Bourdon tube measures this increase and moves an indicator a distance commensurate with the temperature measured. However, errors have resulted from ambient temperature changes at the Bourdon tube because of the relatively large volume of the Bourdon tube. It has been previously proposed to reduce the volume within the Bourdon tube in an attempt to minimize such errors. Problems have been encountered in reducing the volume of such a Bourdon tube temperature sensing element while at the same time retaining the sensitivity of the system.

One of the objects of the invention is to provide an improved method of making a Bourdon tube sensing element for a fluid-operated temperature gauge.

Another of the objects of the invention is to provide an effective process for significantly reducing the volume of the Bourdon tube without affecting the performance or accuracy thereof.

According to one aspect of the present invention, the method of making a Bourdon tube sensing element for a gas temperature gauge essentially comprises the steps of inserting silicon rubber into a Bourdon tube and then subjecting the tube, containing silicone rubber, to a thermal treatment so as to form a small passage along the inner surface of the tube within which the gas to be sensed is received.

According to another aspect of the invention, strips of silicone rubber are inserted into a partially flattened Bourdon tube made of a metal, such as beryllium copper, which is then shaped on a mandrel. The tube is then heated while maintained in a C-shape. After heating, the silicone rubber contracts away from the inner surface of the Bourdon tube to form a small passage therealong.

The silicone rubber or similar material must be so related to the metal of the tube that the heat treating temperature is not so high as to cause destruction of the silicone rubber or the high temperature elastomer used.

Other objects, advantages and features of the present invention will become apparent from the accompanying description and drawings, which are merely exemplary.

In the drawings:

FIG. 1 is an axial sectional view of a temperature gauge according to the present invention;

FIG. 2 is a diagrammatic view illustrating the steps of the present process;

FIG. 3 is a sectional view taken along the line 3—3 of FIG. 1 showing the silicone rubber in the tube prior to the treatment; and FIG. 4 is a portion of the Bourdon tube wherein a section therethrough illustrates the position of the silicone rubber after heat treatment.

Proceeding next to the drawings wherein like reference symbols indicate the same parts throughout the various views, a specific embodiment of the present invention will be described in detail.

In FIG. 1 there is indicated generally at 10 a gas or liquid-filled temperature gauge of the Bourdon type wherein a Bourdon tube 11 has one end connected to a socket 12 inserted through a rear wall 13 of instrument casing 14 into the instrument and, for example, connected through small tubing 15 to a temperature sensing bulb 16. In a manner known in the art, the end of the Bourdon tube 11 is connected by a suitable linkage 17 to an instrument movement 18 which actuates a shaft 19 upon which an indicator pointer 20 is moved over the face of a dial 21 having suitable indicia thereon.

The Bourdon tube 11 according to the present invention is shown in greater detail in FIG. 4 wherein the tube is made of beryllium copper and is filled with a silicone rubber or similar material 22, which contracts from the inside wall of the tube to form relatively small passage zone 23 between the silicone rubber and the inner wall of the tube. It is this passage 23 within which the gas or liquid filling is received through the socket 12.

In order to make the Bourdon tube 11 as shown in FIG. 4, the partially flattened Bourdon tube indicated at 24 in FIG. 2 is filled with one or more strips of silicone rubber at 22. The ends of the tube may be crimped together as at 25.

The tube is then wound about a mandrel 26, as is known in the art, to form the desired C-shaped element.

After the tube is wrapped on the mandrel, ends 25 can be cut off. The tube 27 of beryllium copper is then heated to approximately 600° F.

At the heat treating temperature concerned, the silicone rubber expands and the beryllium copper tubing and the expanded silicone rubber assume the shape of the fixture or mandrel. After heat treating, the silicone rubber contracts while the Bourdon tube retains its expanded shape so as to provide a small but controlled passage at 23 along the inner surface of the Bourdon tube. Without this passage, the fluid or gas would not be completely effective along the entire length of the Bourdon tube. The tube can now be soft soldered in the usual manner to a socket 12 to become a component of the gauge 10.

The tube 24 also could be wound upon an arbor 26 in the form of a helix.

The tube 24, as shown in FIG. 2, can be filled with other high temperature elastomer-type materials other than silicone rubber but having similar expansion characteristics when heated. Such elastomeric materials must be able to withstand the high temperatures created during the heat treating and the soldering operation in assembling the gauge.

Thus, it can be seen that the present invention has disclosed a process for forming a Bourdon tube especially adapted for a fluid-filled temperature gauge wherein the temperature to which the instrument is subjected can be precisely and accurately measured. Rapid fluctuations in temperatures can also be quickly sensed by such a gauge. It is preferably of the gas-filled type, but fluid such as liquid also could be employed.

It will be understood that various details of construction and arrangement of parts may be changed without departing from the spirit of the invention except as defined in the appended claims.

What is claimed is:

1. A Bourdon sensing element for a gas temperature gauge comprising a flattened tubular metallic element, and a high temperature resistant elastomeric material filling substantially the entire interior volume of the metallic element and extending transversely across the element but spaced a small distance from the interior surface of said element to define a small passage means along the inner surface within which a fluid filling is received.

2. A Bourdon sensing element for a gas temperature gauge as claimed in claim 1 wherein the elastomeric material is contracted away from the interior surface.

3. A Bourdon sensing element for a gas temperature gauge as claimed in claim 1 wherein the elastomeric material is silicone rubber.

4. A Bourdon sensing element for a gas temperature gauge as claimed in claim 3 wherein the metallic element is beryllium copper.

* * * * *